United States Patent
Mathison et al.

(10) Patent No.: US 10,938,955 B2
(45) Date of Patent: *Mar. 2, 2021

(54) SYSTEM AND METHOD FOR LIGHTWEIGHT-MACHINE-TO-MACHINE DEVICE REGISTRATION AND ASSIGNMENT

(71) Applicant: Verizon Patent and Licensing Inc., Arlington, VA (US)

(72) Inventors: James Mathison, Warren, NJ (US); Stephen J. Kolanowski, Keller, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/502,486

(22) Filed: Jul. 3, 2019

(65) Prior Publication Data

US 2019/0327341 A1  Oct. 24, 2019

Related U.S. Application Data

(63) Continuation of application No. 15/363,116, filed on Nov. 29, 2016, now Pat. No. 10,455,057.

(51) Int. Cl.
*G06F 15/173* (2006.01)
*H04L 29/08* (2006.01)
*H04L 29/06* (2006.01)
*H04W 4/70* (2018.01)

(52) U.S. Cl.
CPC .............. *H04L 67/34* (2013.01); *H04L 67/02* (2013.01); *H04L 67/42* (2013.01); *H04W 4/70* (2018.02)

(58) Field of Classification Search
CPC ......... H04L 67/34; H04L 67/02; H04L 67/42; H04W 4/70
USPC ........................................................ 709/223
See application file for complete search history.

(56) References Cited

U.S. PATENT DOCUMENTS

| | | | | |
|---|---|---|---|---|
| 2011/0126017 A1* | 5/2011 | Blom | .................. | H04L 63/0892 713/171 |
| 2014/0321328 A1* | 10/2014 | Zuniga | .................... | H04W 8/24 370/254 |
| 2016/0226828 A1* | 8/2016 | Bone | .................... | H04B 1/3816 |

* cited by examiner

*Primary Examiner* — Atta Khan

(57) ABSTRACT

A method assigns a bootstrap server for wireless devices in a machine-to-machine environment. The method includes receiving, by a network device in a wireless access network and from a wireless device, a first request for a bootstrap server identifier. The method also includes providing, to the wireless device, a response including an address for a carrier-specific bootstrap server device. The method also includes receiving, by the carrier-specific bootstrap server device, a request for management server connection information. The request is submitted by the wireless device using the bootstrap server identifier. The method further includes assigning, by the carrier-specific bootstrap server device, the wireless device to a management server of a group of management servers and sending connection information for the management server to the wireless device.

19 Claims, 9 Drawing Sheets

800

| PCO HEADER 810 ||
|---|---|
| PROTOCOL ID 820-A | PROTOCOL CONTENT 825-A |
| ⋮ | ⋮ |
| PROTOCOL ID 820-N | PROTOCOL CONTENT 825-N |
| CONTAINER ID 830-A | CONTAINER CONTENT 835-A |
| ⋮ | ⋮ |
| LW BOOTSTRAP SERVER CONTAINER ID (830-X) | LW BOOTSTRAP SERVER 835-X |
| ⋮ | ⋮ |
| CONTAINER ID 830-N | CONTAINER CONTENT 835-N |

FIG. 8

SYSTEM AND METHOD FOR LIGHTWEIGHT-MACHINE-TO-MACHINE DEVICE REGISTRATION AND ASSIGNMENT

CROSS-REFERENCE TO RELATED APPLICATION

This application is a continuation of U.S. patent application Ser. No. 15/363,116 entitled "System and Method for Lightweight-Machine-to-Machine Device Registration and Assignment" filed on Nov. 29, 2016, the disclosure of which is hereby incorporated by reference.

BACKGROUND

Lightweight-Machine-to-Machine (LW-M2M) is an over-the-air (OTA) protocol for M2M or Internet-of-Things (IoT) device management. The LW-M2M specification was developed by the Open Mobile Alliance, and is a standard that mobile carriers can adopt for device management. With LW-M2M, a client on the M2M device is responsible for registering with, and periodically checking in with, a LW-M2M server in the network to manage device configuration parameters and to deliver various key performance indicators and measurements (e.g., network signal strength) that can be used for internal or external data analysis services.

BRIEF DESCRIPTION OF THE DRAWINGS

FIG. 8 is a diagram illustrating an exemplary Protocol Configuration Option (PCO) message according to an implementation described herein;

DETAILED DESCRIPTION OF PREFERRED EMBODIMENTS

The following detailed description refers to the accompanying drawings. The same reference numbers in different drawings may identify the same or similar elements.

The use of Lightweight-Machine-to-Machine (LW-M2M) protocols allows for services like data collection, analysis, reporting, etc. However, LW-M2M also introduces a challenge of how to ensure that a device is talking to the correct LW-M2M server. Particularly, if a mobile carrier deploys a number of LW-M2M servers for scale purposes, there is a need to balance the load across the available servers. Carrier-specific devices may be configured with a hard-coded LW-M2M server uniform resource locator (URL) in the LW-M2M device client. However, when a device is ported from one carrier to another (e.g., using OTA reprogramming of an electronic subscriber identity module (eSIM)), the hard-coded URL would not be useable by the new carrier. In some cases, the device may be unable to resolve the fully qualified domain name (FQDN) in the hard-coded URL, precluding any attempt by the device to use any LW-M2M server. In other cases, the device may resolve the FQDN to an unusable LW-M2M server on a previous carrier's network.

Systems and methods described herein assign a device to a LW bootstrap server that will enable M2M devices to discover and register with a local LW-M2M server on whichever mobile carrier's network the M2M devices are assigned. The M2M device may request the LW bootstrap server identity when it attaches to a cellular network. Obtaining the LW bootstrap server identity as part of the attachment process obviates the need for a hard-coded URL in the LW-M2M device client. Instead, the network can directly provide an address for the LW-M2M bootstrap server to the M2M device when it attaches to the network. Thus, M2M devices originally serviced by another carrier can be managed under the LW-M2M protocol after porting to a new carrier. In one implementation, a network-centric LW-bootstrap server assignment may be provided by having an M2M device request the LW bootstrap server URL during attachment and receive the LW bootstrap server URL using the existing Protocol Configuration Options (PCO) field in Long-Term Evolution (LTE) signaling.

Figure 1:
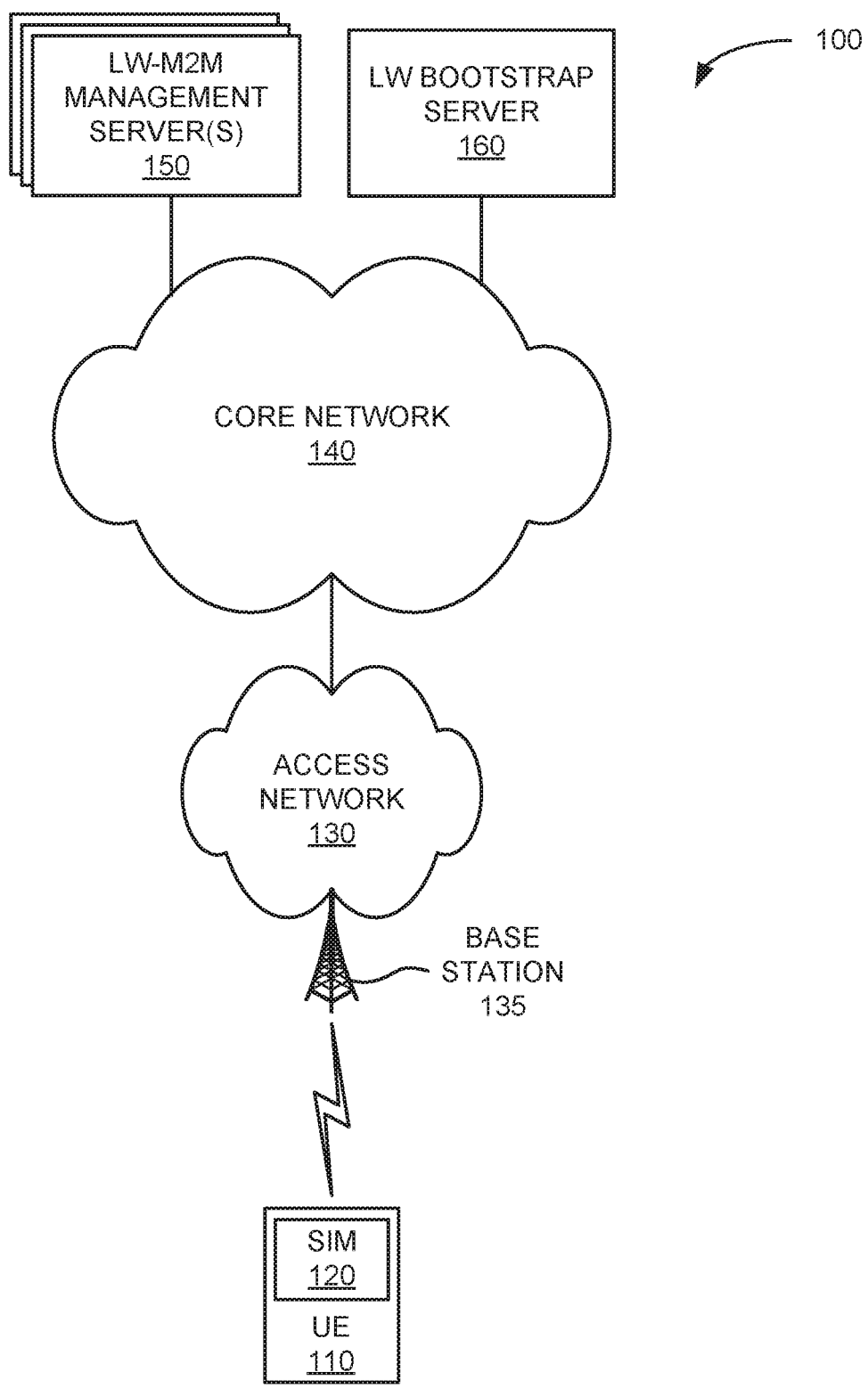
FIG. 1 is a diagram illustrating an exemplary network environment according to an implementation described herein.

FIG. 1 is a diagram illustrating an exemplary environment 100 in which systems and methods described herein may be implemented. As illustrated, environment 100 may include user equipment (UE) 110, an access network 130, a core network 140, one or more management servers 150, and a bootstrap server 160.

UE 110 may include a mobile communication device (e.g., a mobile phone, a smart phone, a phablet device, a wearable computer device (e.g., a head-mounted display computer device, a wristwatch computer device, etc.), a global positioning system (GPS) device, and/or another type of wireless device); a laptop computer, a tablet computer, or another type of portable computer; a media playing device; a portable gaming system; and/or any other type of mobile computer device with communication and output capabilities.

In some implementations, UE 110 may correspond to an embedded wireless device that communicates wirelessly with other devices over a machine-to-machine (M2M) interface. For example, UE 110 may be electrically connected to any electronic device with a microcontroller, such as a microcontroller controlling one or more actuators, a microcontroller controlling one or more sensors, a microcontroller that performs data processing, and/or another type of electronic device with a microcontroller. Non-limiting examples of such devices may include a health monitoring device (e.g., a blood pressure monitoring device, a blood glucose monitoring device, etc.), an asset tracking device (e.g., a system monitoring the geographic location of a fleet of vehicles, etc.), a device controlling one or more functions of a vehicle (e.g., a climate control system, an engine monitoring system, etc.), and/or another type of electronic device. In some cases, UE 110 may be designed to perform a particular set of limited functions and, thus, may be referred to as a resource constrained device.

In some implementations, UE 110 may include a subscriber identity module (SIM) card 120. SIM card 120 may include a conventional SIM or a programmable SIM, such as an embedded Universal Integrated Circuit Card (eUICC), which may store information for multiple subscriptions that may be activated for UE 110. In some cases, SIM card 120 may be a non-removable component, integral with UE 110. In other cases, SIM card 120 may be electrically coupled to UE 110 by being inserted into a slot of UE 110 (not shown in FIG. 1). UE 110 may wirelessly communicate with one or more of access networks 130.

Access network 130 may provide access to core network 140 for wireless devices, such as UE 110. Access network 130 may enable UE 110 to provide mobile telephone service and/or data services to UE 110. Access network 130 may include a base station 135, and UE 110 may wirelessly communicate with access network 130 via base station 135. Access network 130 may establish a packet data network connection between UE 110 and core network 140. For example, access network 130 may establish an Internet Protocol (IP) connection between UE 110 and core network 140.

In some implementations, access network 130 may include a Long Term Evolution (LTE) access network (e.g., an evolved packet core (EPC) network) or LTE-Advanced (LTE-A) access network based on the LTE standard specified by the 3$^{rd}$ Generation Partnership Project (3GPP). In other implementations, access network 130 may include a Code Division Multiple Access (CDMA) access network based on, for example, a CDMA2000 standard. For example, the CDMA access network may include a CDMA enhanced High Rate Packet Data (eHRPD) network (which may provide access to an LTE access network).

Core network 140 may include a local area network (LAN), a wide area network (WAN), a metropolitan area network (MAN), an optical network, a cable television network, a satellite network, a wireless network (e.g., a Code Division Multiple Access (CDMA) network, a general packet radio service (GPRS) network, and/or an LTE network), an ad hoc network, a telephone network (e.g., the Public Switched Telephone Network (PSTN) or a cellular network), an intranet, the Internet, or a combination of networks. Core network 140 may allow the delivery of Internet Protocol (IP) services to UE 110, and may interface with other external networks. Core network 140 may include one or more server devices and/or network devices, or other types of computation or communication devices. In one example implementation, core network 140 may include an Internet Protocol Multimedia Subsystem (IMS) network (not shown in FIG. 1). An IMS network may include a network for delivering IP multimedia services as specified by 3GPP and may provide media flows between UE device 110 and external IP networks or external circuit-switched networks (not shown in FIG. 1).

LW-M2M management server 150, also referred to as management server 150, may include one or more network devices, such as computer devices and/or server devices, which maintain device configuration settings and data collection parameters for UEs 110. Management server 150 may register UEs 110 and manage device configuration parameters (such as an access point name (APN) table configuration). Management server 150 may receive from UE 110 various key performance indicators and measurements (such as network signal strength) that can be used for internal or external data analysis services. In some implementations, multiple management servers 150 may be deployed in environment 100 for scale purposes and each of UE 110 may be assigned to a particular management server 150. The use of multiple management servers 150 may require load balancing across available management servers 150.

LW bootstrap server 160, also referred to as bootstrap server 160, may include one or more network devices, such as computer devices and/or server devices, which facilitate load balancing and secure communications between UE 110 and management servers 150. For example, LW bootstrap server 160 may act as an intermediary element in environment 100 that provides application independent functions for mutual authentication of mobile terminals (e.g., UE 110) and application servers (e.g., management server 150) to each other and for "bootstrapping" the exchange of secret session keys afterwards. The bootstrap procedure may be initiated, for example, during initial power-up of UE 110 or in response to a message from a device in network 150 instructing UE 110 to begin a bootstrap operation.

Although FIG. 1 shows exemplary components of environment 100, in other implementations, environment 100 may include fewer components, different components, differently-arranged components, or additional functional components than depicted in FIG. 1. Additionally or alternatively, one or more components of environment 100 may perform functions described as being performed by one or more other components of environment 100.

Figure 2:
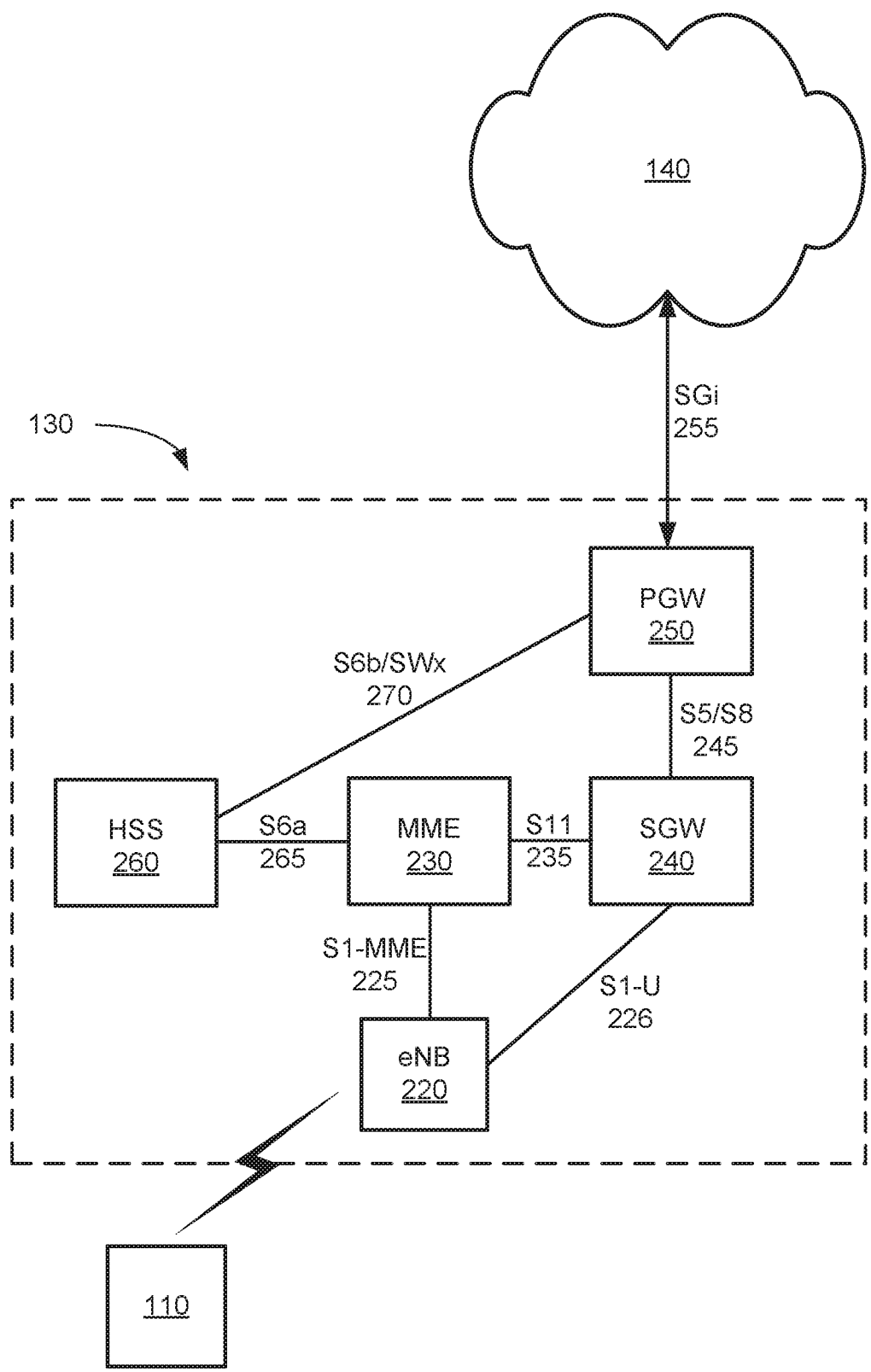
FIG. 2 is a diagram illustrating exemplary components of the access network of FIG. 1.

FIG. 2 is a diagram illustrating components of access network 130 according to an implementation described herein. As shown in FIG. 2, access network 130 may correspond to a Long Term Evolution (LTE) access network. Access network 130 may include one or more devices that implement logical entities interconnected via standardized interfaces, and that provide wireless packet-switched services and wireless IP connectivity to user devices for both data and voice services. Access network 130 may include an eNodeB 220 ("eNB," corresponding to base station 135 of FIG. 1), a mobility management entity (MME) device 230, a serving gateway (SGW) device 240, a packet data network (PDN) gateway (PGW) device 250, and a home subscriber server (HSS) device 260. While FIG. 2 depicts a single eNodeB 220, MME device 230, SGW 240 device, PGW device 250, and HSS device 260 for illustration purposes, in other implementations FIG. 2 may include multiple eNodeBs 220, MME devices 230, SGW devices 240, PGW devices 250, and/or HSS devices 260.

eNodeB 220 may include one or more devices (e.g., base stations) and other components and functionality that allow UE 110 to wirelessly connect to access network 130. eNodeB 220 may interface with access network 130 via an interface referred to as an S1 interface, which may be split into a control plane S1-MME interface 225 and a data plane S1-U interface 226. S1-MME interface 225 may interface with MME device 230. S1-MME interface 225 may be implemented, for example, with a protocol stack that includes a Non-Access Stratum (NAS) protocol and/or Stream Control Transmission Protocol (SCTP). An S1-U interface 226 may interface with SGW 240 and may be implemented, for example, using a General Packet Radio Service Tunneling Protocol version 2 (GTPv2).

MME device 230 may implement control plane processing for access network 130. For example, MME device 230 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME device 230 may also select a particular SGW device 240 for a particular UE 110. A particular MME device 230 may interface with other MME devices 230 in access network 130 and may send and receive information associated with UEs, which may allow one MME device to take over control plane processing of UEs serviced by another MME device, if the other MME device becomes unavailable.

MME device 230 may communicate with SGW device 240 through an S11 interface 235. S11 interface 235 may be implemented, for example, using GTPv2. S11 interface 235 may be used to create and manage a new session for a particular UE 110. S11 interface 235 may be activated when MME device 230 needs to communicate with SGW device 240, such as when the particular UE 110 attaches to access network 130, when bearers need to be added or modified for an existing session for the particular UE 110, when a connection to a new PGW device 250 needs to created, or during a handover procedure (e.g., when the particular UE 110 needs to switch to a different SGW device 240).

SGW device 240 may provide an access point to and from UE 110, may handle forwarding of data packets for UE 110, and may act as a local anchor point during handover procedures between eNodeBs 220. SGW device 240 may interface with PGW device 250 through an S5/S8 interface 245. S5/S8 interface 245 may be implemented, for example, using GTPv2.

PGW device 250 may function as a gateway to core network 140 through an SGi interface 255. Core network 140 may include, for example, an IP Multimedia Subsystem (IMS) network, which may provide data, voice, and multimedia services to UE 110, based on Session Initiation Protocol (SIP). A particular UE 110, while connected to a single SGW device 240, may be connected to multiple PGW devices 250, one for each packet network with which UE 110 communicates.

HSS device 260 may store information associated with UEs 110 and/or information associated with users of UEs 110. For example, HSS device 260 may store user profiles that include authentication and access authorization information. HSS device 260 may store subscription status information and user profile information for UEs 110 and/or SIM cards 120. HSS device 260 may receive the subscription status information and user profile information from, for example, a provisioning system or a customer management system. MME device 230 may communicate with HSS device 260 through an S6a interface 265. S6a interface 265 may be implemented, for example, using a Diameter protocol. PGW device 250 may communicate with HSS device 260 directly or indirectly (e.g., via an Authentication, Authorization, and Accounting (AAA) server, not shown) through S6b/SWx interfaces 270. PGW device 250 may obtain subscription information for UE 110 (or SIM card 120) from HSS device 260 interfaces 270 when PGW device 250 authenticates UE 110 to determine what network services UE 110 is authorized to use and to authorize an Internet Access Point Name for UE 110. In cases where, an attach request from UE 110 also includes a request for a bootstrap server identity, the subscription information may also include an address (e.g., a URL) for bootstrap server 160. In other implementations, the bootstrap server address may be stored at PGW device 250. PGW device 250 may then send a message (such as a PCO message) that includes the subscription information and the bootstrap server address to UE 110 via SGW device 240.

In other implementations, MME device 230 may obtain the subscription status information and the bootstrap server address from HSS device 260 when MME device 230 authenticates UE 110 in response to UE 110 requesting to attach to access network 130. In this implementation, MME device 230 may generate a message, configured, for example, as a new or existing NAS parameter, that includes the subscription status information and bootstrap server address. MME device 230 may send the message to UE 110 via eNodeB 220. In other implementations, the bootstrap server address may be stored at MME 230. Thus, the bootstrap server address may be stored locally at any of MME 230, PGW device 250, HSS device 260, or another device within access network 130. Regardless of how the bootstrap server address is obtained from access network 130, UE 110 may use the bootstrap server address to initiate communications with bootstrap server 160 over core network 140.

Although FIG. 2 shows exemplary components of access network 130, in other implementations, access network 130 may include fewer components, different components, differently arranged components, or additional components than depicted in FIG. 2. Additionally or alternatively, one or more components of access network 130 may perform functions described as being performed by one or more other components of access network 130.

Figure 3:
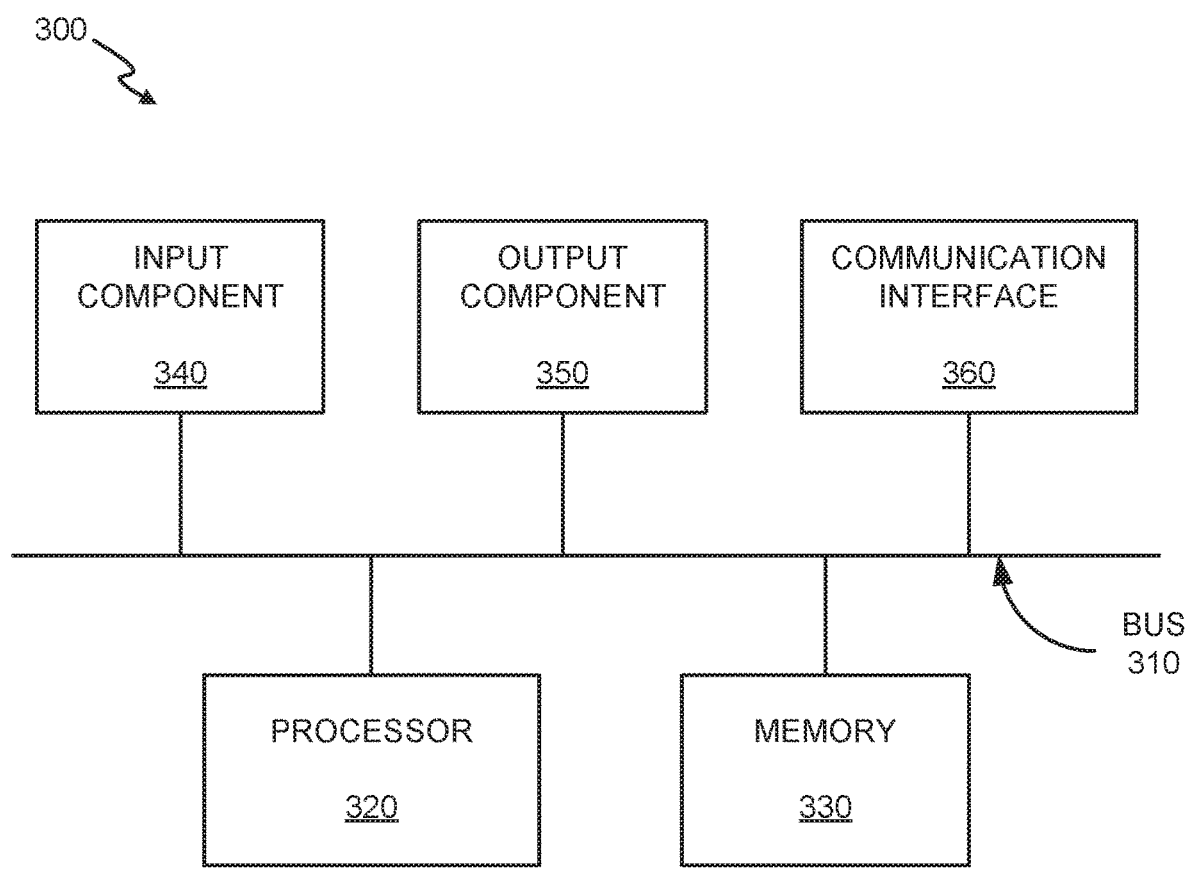
FIG. 3 is a diagram illustrating exemplary components of a device that may be included in a device of FIG. 1.

FIG. 3 is a diagram illustrating exemplary components of a device 300. Device 300 may correspond, for example, to a component of UE 110, management server 150, bootstrap server 160, eNodeB 220, MME device 230, SGW device 240, PGW device 250, HSS device 260, or another component of network environment 100. Device 300 may include a bus 310, a processor 320, a memory 330, an input component 340, an output component 350, and a communication interface 360.

Bus 310 may include a path that permits communication among the components of device 300. Processor 320 may include a processor, a microprocessor, or processing logic that may interpret and execute instructions. Memory 330 may include any type of dynamic storage device that may store information and instructions, for execution by processor 320, and/or any type of non-volatile storage device that may store information for use by processor 320. Input component 340 may include a mechanism that permits a user to input information to device 300, such as a keyboard, a keypad, a button, a switch, etc. Output component 350 may include a mechanism that outputs information to the user, such as a display, a speaker, one or more light emitting diodes (LEDs), etc.

Communication interface 360 may include a transceiver that enables device 300 to communicate with other devices and/or systems via wireless communications, wired communications, or a combination of wireless and wired communications. For example, communication interface 360 may include mechanisms for communicating with another device or system via a network. Communication interface 360 may include an antenna assembly for transmission and/or reception of radio frequency (RF) signals. For example, communication interface 360 may include one or more antennas to transmit and/or receive RF signals over the air. Communication interface 360 may, for example, receive RF signals and transmit them over the air to UE 110/eNodeB 220, and receive RF signals over the air from eNodeB 220/UE 110. In one implementation, for example, communication interface 360 may communicate with a network and/or devices connected to a network. Alternatively or additionally, communication interface 360 may be a logical component that includes input and output ports, input and output systems, and/or other input and output components that facilitate the transmission of data to other devices.

Device 300 may perform certain operations in response to processor 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device. The software instructions contained in memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Device 300 may include fewer components, additional components, different components, and/or differently arranged components than those illustrated in FIG. 3. As an example, in some implementations, a display may not be included in device 300. In these situations, device 300 may be a "headless" device that does not include input component 340. Additionally, or alternatively, one or more operations described as being performed by a particular component of device 300 may be performed by one or more other components, in addition to or instead of the particular component of device 300.

Figure 4:
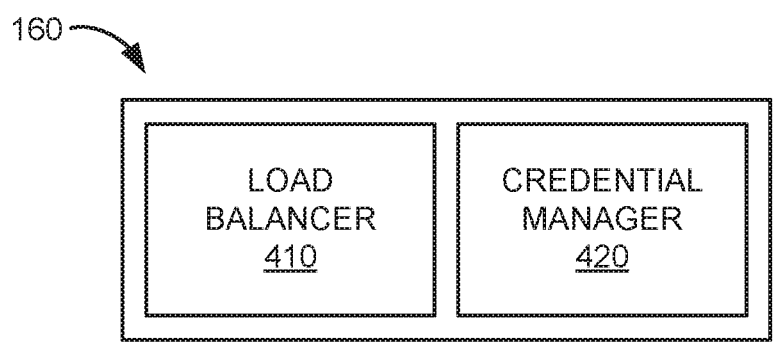
FIG. 4 is a diagram illustrating exemplary functional components of the bootstrap server of FIG. 1.

FIG. 4 is a diagram illustrating exemplary functional components of bootstrap server 160 according to an implementation described herein. The functional components of bootstrap server 160 may be implemented, for example, via processor 320 executing instructions from memory 330. As shown in FIG. 4, bootstrap server 160 may include a load balancer 410 and a credential manger 420.

Load balancer 410 may receive service requests from UEs 110 for a management server address (e.g., a LW-M2M management server). Load balancer 410 may load balance the requests over multiple management servers 150. For example, load balancer 410 may assign a UE 110 to a particular management server 150 based on available resources (e.g., best processing times, error rates, quality-of-service requirements, service/maintenance schedules, etc.), geography, number of assigned devices, cost metrics, etc. In one implementation, environment 100 may include multiple redundant management servers 150 (e.g., with geographic diversity). For example, management servers 150 may be located in different regions or states to minimize communication path lengths and/or limit impact from localized failures (e.g., power disruptions, natural disasters, etc.).

Credential manager 420 may provide credentials, such as a session key, for use by UE 110 with the assigned management server 150. Credential manager 420 may arrange secure keys with UE 110 and later provide the secure keys to the assigned management server 150 (e.g., upon request from management server 150 when UE 110 attempts to establish a connection). In one implementation, UE 110 stores a secure key generated by credential manager 420 and uses the secure key to send encrypted device-specific data (e.g., an International Mobile Equipment Identity (IMEI), a mobile equipment identifier (MEID), etc.) to the assigned management server 150. The assigned management server 150 may use the secure key obtained from credential manager 420 to decrypt the message from UE 110 and validate UE 110.

Figure 5:
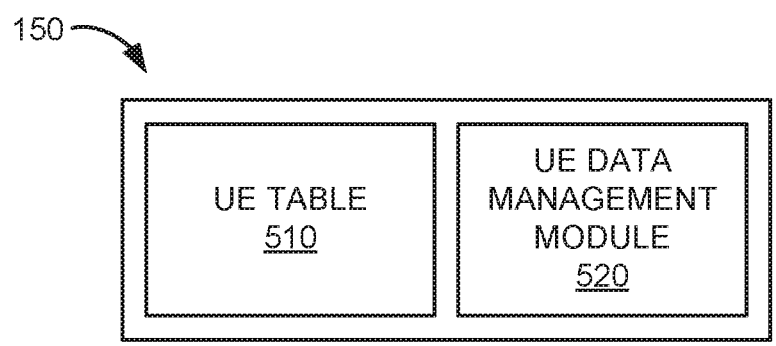
FIG. 5 is a diagram illustrating exemplary functional components of the management server of FIG. 1.

FIG. 5 is a diagram illustrating exemplary functional components of management server 150 according to an implementation described herein. The functional components of management server 150 may be implemented, for example, via processor 320 executing instructions from memory 330. As shown in FIG. 5, management server 150 may include a UE table 510 and a UE data management module 520.

UE table 510 may track registration status and services for individual UEs 110 assigned to a particular management server 150. In one implementation, a record for each UE 110 may include, among other information, a unique ID for UE 110 (e.g., an IMEI, a MEID, a mobile device number (MDN), a universally unique identifier (UUID), etc.) and a bootstrap status flag. In other implementations, UE table 510 may include additional information about each UE 110, such as a subscriber account, device type, etc. The bootstrap status flag, for example, may be toggled "on" when UE 110 has successfully completed a registration with management server 150 via bootstrap server 160. As long as the bootstrap status flag is toggled on, UE 110 may connect to the assigned management server 150 without again contacting bootstrap server 160. The bootstrap status flag, for example, may be toggled "off" when UE 110 is required to re-connect through bootstrap server 160. In one example, the bootstrap status flag may be toggled off when UE 110 fails to provide matching credentials. In another example, the bootstrap status flag may be toggled off when a security change or upgrade is implemented (e.g., by direction of a network administrator). If a bootstrap status flag is off for a particular UE 110, UE 110 may be redirected to request a bootstrap server address from access network 130. In some implementations, UE 110 may be required to re-attach to access network 130 to submit a new bootstrap server address request.

UE data management module 520 may include configuration settings for UE data. For example, UE data management module 520 may allow for remote changes that manage what types of data are provided by UE 110, what frequency data is to be provided, data formats, retry intervals, security protocols, and the like. In one implementation, UE data management module 520 may conform to LW-M2M protocol.

Figure 6:
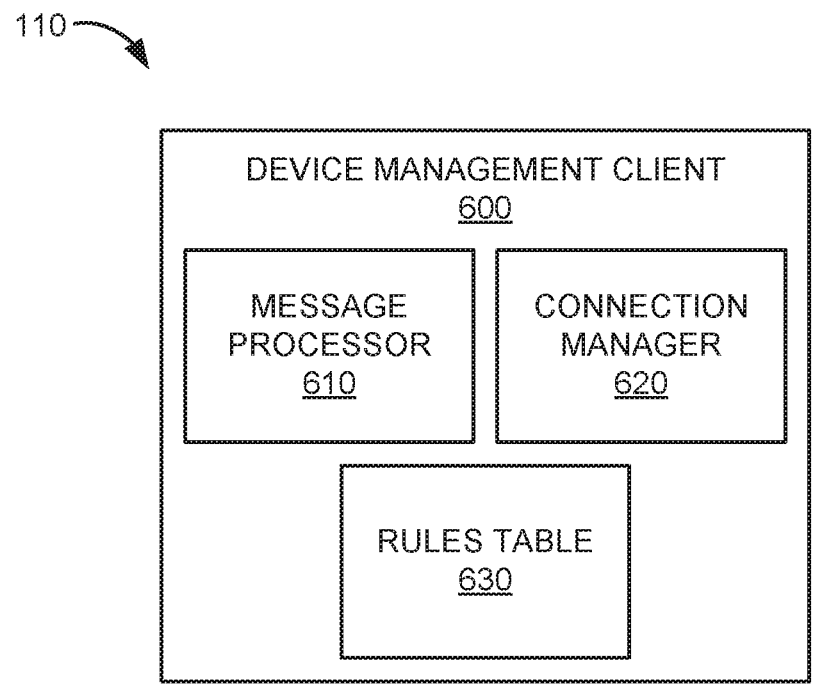
FIG. 6 is a diagram illustrating exemplary functional components of the UE of FIG. 1.

FIG. 6 is a diagram illustrating exemplary functional components of UE 110 according to an implementation described herein. The functional components of UE 110 may be implemented, for example, via processor 320 executing instructions from memory 330. Alternatively, some or all of the functional components of UE 110 may be implemented via hard-wired circuitry. As shown in FIG. 6, UE 110 may include a device management client 600. Device management client 600 may manage device registration and instructions for UE 110. As shown in FIG. 6, device management client 600 may include a message processor 610, connection manager 620, and a rules table 630.

Message processor 610 may detect messages (such as PCO messages) received from access network 130 and may process the detected messages. According to an implementation described herein, message processor 610 may identify a LW bootstrap server field in a received PCO message and may retrieve a LW bootstrap server address from the LW bootstrap server field. Message processor 610 may extract the LW bootstrap server address (e.g., for bootstrap server 160) to allow connection manager 620 to submit a request for management server connection information to bootstrap server 160.

Connection manager 620 may request a bootstrap server address (e.g., as part of an attach procedure) and the use LW bootstrap server address to communicate with bootstrap server 160 and obtain connection information (e.g., an address, credentials, etc.) for an assigned management server 150. Connection manager 620 may use the connection information to register with the assigned management server 150. In one implementation, connection manager 620 may store the connection information or updated credentials for use in subsequent communications with management server 150.

Rules table 630 may include configuration settings for UE 110 to collect and/or report data. In one implementation, rules table 630 may include settings received from management server 150 after UE 110 has registered with management server 150.

Although FIGS. 4-6 show exemplary functional components of bootstrap server 160, management server 150, and UE 110, in other implementations, these devices may include fewer functional components, different functional components, or additional functional components than depicted in FIGS. 4-6. Additionally or alternatively, one or more functional components of may perform functions described as being performed by one or more other functional components.

Figure 7:
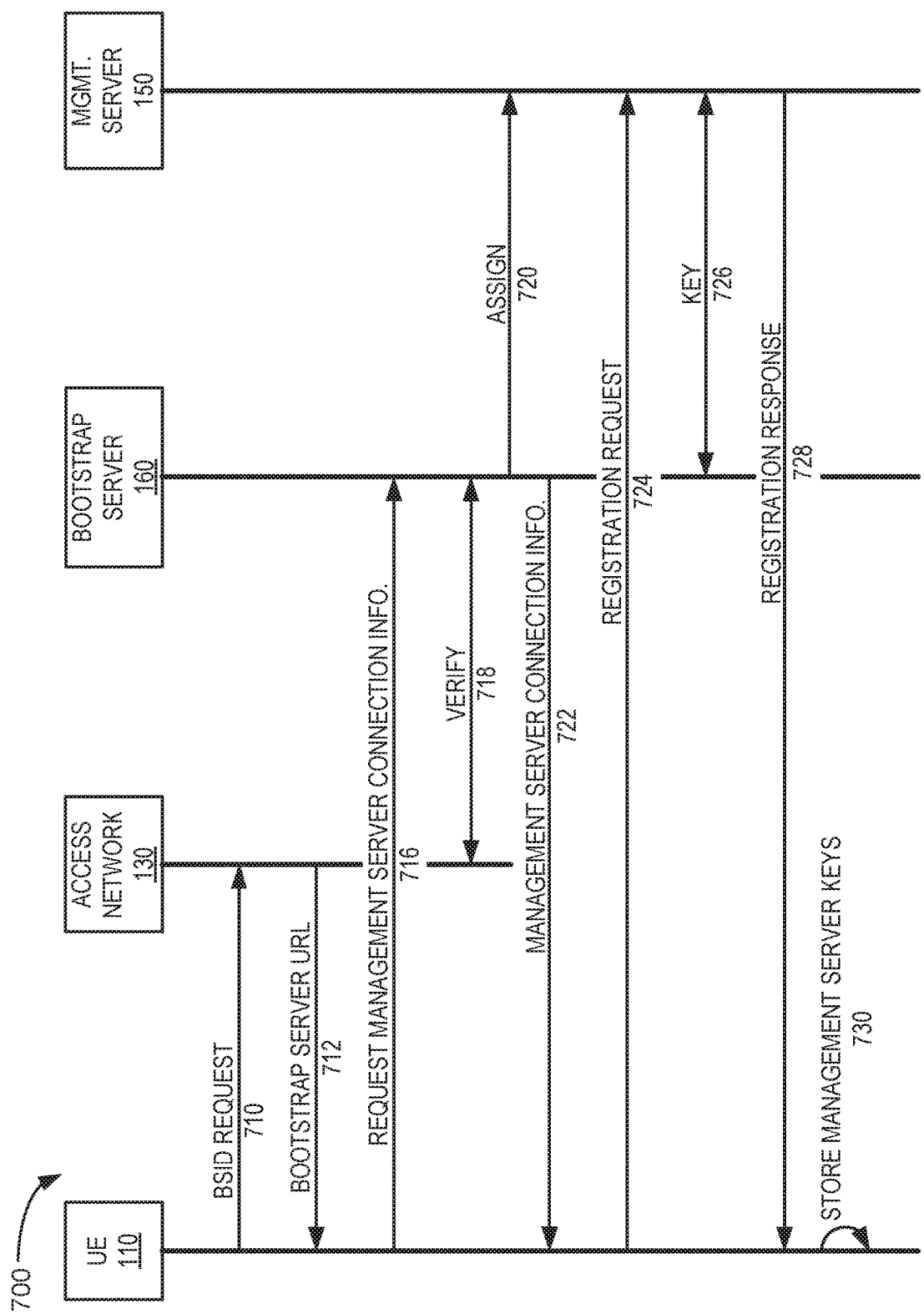
FIG. 7 is an exemplary signal flow diagram according to an implementation described herein.

FIG. 7 is an exemplary signal flow diagram 700 for enabling a UE to discover and register with a local management server via a bootstrap server, according to an implementation described herein. As shown in FIG. 7, signal flow diagram 700 may include UE 110 providing a bootstrap server identifier (BSID) request (signal 710) to access network 130. In one implementation, the bootstrap server identifier request may be included with another communication, such as an attach request. In another implementation, the bootstrap server identifier request may be included as a separate request after network attachment.

A device in access network 130, such as MME 230 or a downstream network device, may receive the bootstrap server identifier request, and, if necessary extract the bootstrap server identifier request from an attach request. In response to the bootstrap server identifier request, network 130 may provide a bootstrap server URL (signal 712). The bootstrap server URL may include a URL for a bootstrap server (e.g., bootstrap server 160) associated with the particular mobile carrier for access network 130.

In response to receiving the bootstrap server URL in signal 712, UE 110 may connect to bootstrap server 160 via core network 140 and may request connection information for management server 150 (signal 716). Bootstrap server 160 may receive the request for management server connection information and verify, with access network 130 (or another network entity), a user profile for UE 110 (signal 718). Assuming successful verification, bootstrap server 160 may assign an applicable management server 150 for UE 110 (signal 720), and arrange for a secure connection between UE 110 and management server 150. For example, as shown in FIG. 7, bootstrap server 160 may provide management server connection information (e.g., for management server 150) to UE 110 (signal 722). The management server connection information may include, for example, a management server URL and a session key to allow UE 110 to connect to management server 150.

In response to receiving the management server connection information, UE 110 may provide a registration request to management server 150 (signal 724). The registration request may include an encrypted string or token based on the session key previously provided to UE 110 by bootstrap server 160. Management server 150 may receive the registration request and obtain a corresponding session key from bootstrap server 160 to authenticate UE 110 (signal 726). Alternatively, the session key may be provided as part of the assignment signal 720. Assuming successful authentication (e.g., a match of the encrypted string or token from signal 724 and signal 726), management server 150 may provide a registration response to UE 110 (signal 728), after which UE 110 and management server 150 can perform data exchanges. In one implementation, UE 110 may store the session key (or an updated secure key) for management server 150 (signal 730). The stored key may be used for later data exchange sessions with management server 150 for as long as UE 110 remains on a current device list (e.g., UE table 510) of management server 150. For example, if a network administrator assigned UE 110 to another management server, UE 110 would be removed or marked as not current in UE table 510. A subsequent attempt by UE 110 to connect to management server 150 would be rejected, for example, when UE 110 was not included in UE table 510, and UE 110 would need to submit a BSID request (e.g., BSID request 710) to obtain new management server connection information.

FIG. 8 is a diagram illustrating an exemplary Protocol Configuration Option (PCO) message 800. As shown in FIG. 8, PCO message 800 may include a PCO header 810, one or more protocol identifier (ID) fields 820-A to 820-N and corresponding protocol content fields 825-A to 825-N, and one or more container ID fields 830-A to 830-N and corresponding container content fields 835-A to 835-N.

PCO header 810 may include information identifying the message as a PCO message. Protocol ID field 820 may identify a particular protocol and protocol content field 825 may include content associated with a particular protocol. The particular protocol may correspond to a protocol used by access network 130 to communicate with UE 110. Container ID field 830 may identify a particular container and container content field 835 may store content associated with the particular container. Each particular container may be assigned to carry a particular piece of information or multiple pieces of information. For example, PCO message may include containers to provide additional optional information about the destination network that UE 110 is connecting to. Thus, one container ID field 830 may be designated for a default gateway IP address, while another container ID field 830 may be designated for a Domain Name System (DNS) server address, etc.

PCO message 800 may include a LW bootstrap server container ID field 830-X and a corresponding LW bootstrap server field 835-X. LW bootstrap server container ID field 830-X may identify LW bootstrap server field 835-X as storing an identifier for a carrier-specific LW bootstrap server and LW bootstrap server field 835-X may store the identifier. In some implementations, the LW bootstrap server identifier may be represented by a URL for accessing the LW bootstrap server (e.g., www.carrier-name.lwbootstrap.com).

Although FIG. 8 shows exemplary fields of PCO message 800, in other implementations, PCO message 800 may include different, differently arranged, fewer, or additional fields than depicted in FIG. 8.

Figure 9:
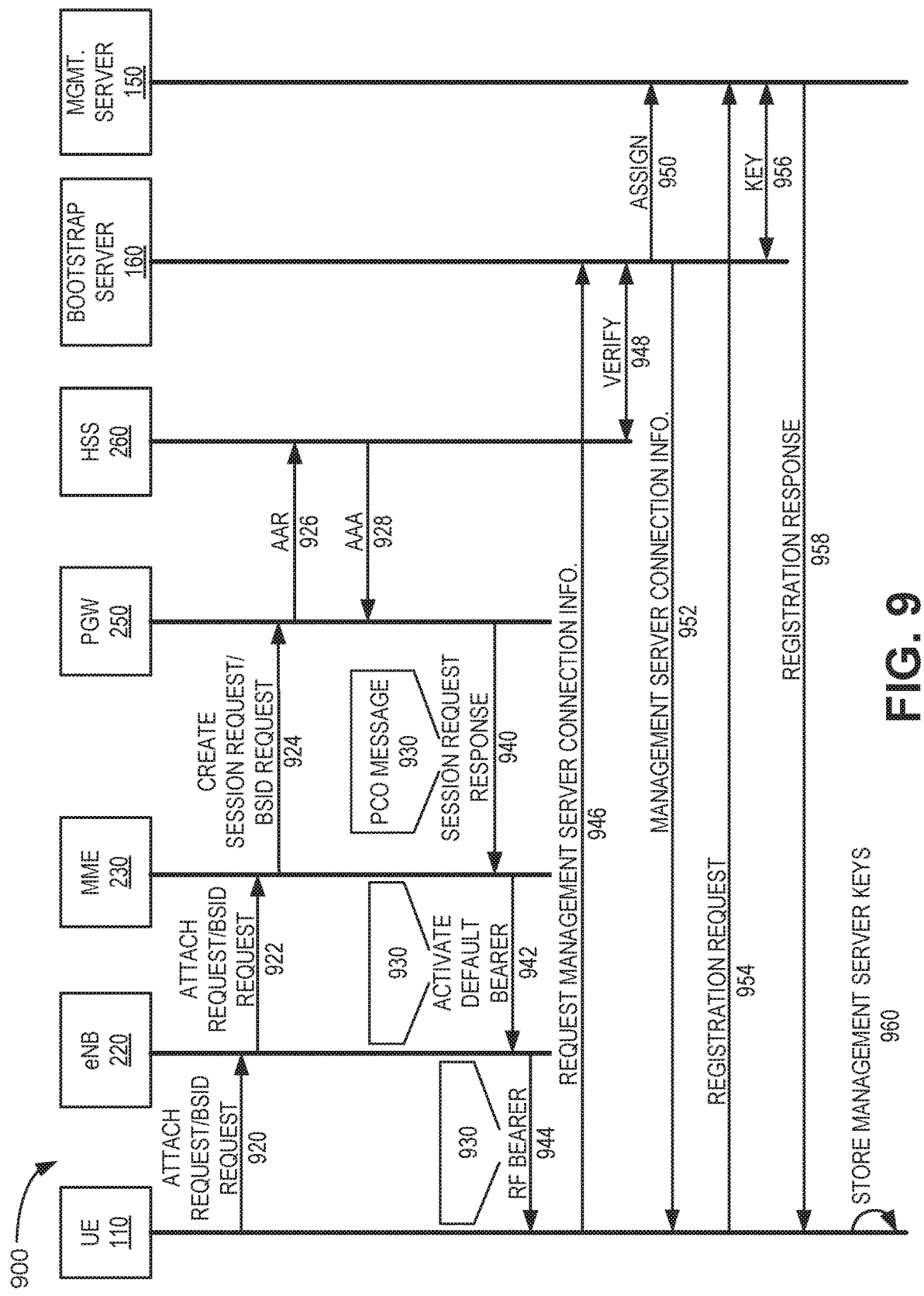
FIG. 9 is an exemplary signal flow diagram according to another implementation described herein.

FIG. 9 is an exemplary signal flow diagram 900 for assigning a device to a bootstrap server using a PCO message, according to an implementation described herein. FIG. 9 illustrates how a UE may obtain a bootstrap server identity upon attachment to an access network and receive a bootstrap server indication via a PCO message. As shown in FIG. 9, after UE 110 is powered on and the communication capability of UE 110 is activated, UE 110 may detect the presence of eNodeB 220 and may send an attach request and bootstrap server identification (BSID) request to eNodeB 220 (signal 920). The attach request may include information identifying UE 110 (and/or SIM card 120, not shown). The BSID request may include a request for a URL or other identifier for the bootstrap server (e.g., bootstrap server 160) associated with the particular mobile carrier. For example, UE 110 may provide an attach request with a PCO attribute value pair (AVP) having the LW bootstrap server container ID (e.g., corresponding to LW bootstrap server container ID field 830-X). eNodeB 220 may forward the attach request and BSID request to MME device 230 (signal 922). MME device 230 may send a create session request along with the BSID request to PGW device 250 (signal 924). The create session request may cause PGW device 250 to reserve resources for creating a default bearer from UE 110 to PGW device 250 and/or to assign an IP address to UE 110 in order to enable a connection to core network 140.

In response to the create session request, PGW device 250 may send an Authentication Authorization Request (AAR) to HSS device 260 to authorize an APN for UE 110 (signal 926). HSS device 260 may retrieve a profile for UE 110 and/or SIM card 120 and may authenticate UE 110/SIM card 120. Furthermore, HSS device 260 may retrieve a bootstrap server URL for UE 110/SIM card 120. HSS device 260 may respond with an Authentication Authorization Answer (AAA) to PGW device 250 (signal 928). The AAA may authorize authentication of UE 110/SIM card 120 and may include the retrieved bootstrap server URL.

PGW device 250 may generate a PCO message 930 that includes the bootstrap server URL obtained from HSS device 260. Furthermore, PGW device 250 may reserve the resources, may assign an IP address to UE 110, and may respond to MME device 230 with a session request response, indicating that a session has been created for UE 110 (signal 940). The session request response may include the generated PCO message 930 with the bootstrap server URL.

MME device 230 may send an activate default bearer instruction to eNodeB 220 and may include PCO message 930 in the activate default bearer instruction (signal 942). eNodeB 220 may instruct UE 110 to set up an RF bearer and may include PCO message 930 in the instruction (signal 944). UE 110 may receive the PCO message via eNodeB 220 and may retrieve the bootstrap server URL from PCO message 930. Furthermore, UE 110 may set up the RF bearer and respond with an RF bearer complete message and eNodeB 220 may report to MME device 230 that the attachment procedure is complete (signals not shown). MME device 230 may respond by sending an update bearer message to PGW device 250 and PGW device 250 may update the bearer based on the requirements of the established RF bearer and may respond back to MME device 230 with an update bearer response once the bearer has been updated (signals not shown). PGW device 250 may then communicate with UE 110 by advertising the IP edge router of core network 140 to UE 110 via eNodeB 220 (not shown in FIG. 9).

In response to receiving the bootstrap server URL in PCO message 930, UE 110 may connect to bootstrap server 160 via the connection to core network 140 through PGW device 250. Subsequent signals 946 through 960 may be similar to signals 716 through 730 described above in connection with FIG. 7. UE 110 may request connection information for management server from bootstrap server 160 (signal 946). Bootstrap server 160 may verify, with HSS device 260 (or another network entity), a user profile for UE 110 (signal 948), assign an applicable management server 150 for UE 110 (signal 950), and provide management server connection information (e.g., for management server 150) to UE 110 (signal 952). UE 110 may then provide a registration request to management server 150 (signal 954). Management server 150 may receive the registration request and obtain a corresponding session key from bootstrap server 160 to authenticate UE 110 (signal 956) and may provide a registration response to UE 110 (signal 958), after which UE 110 and management server 150 can perform data exchanges. UE 110 may store the session key (or an updated secure key) for management server 150 (signal 960) for future connections.

Figure 10:
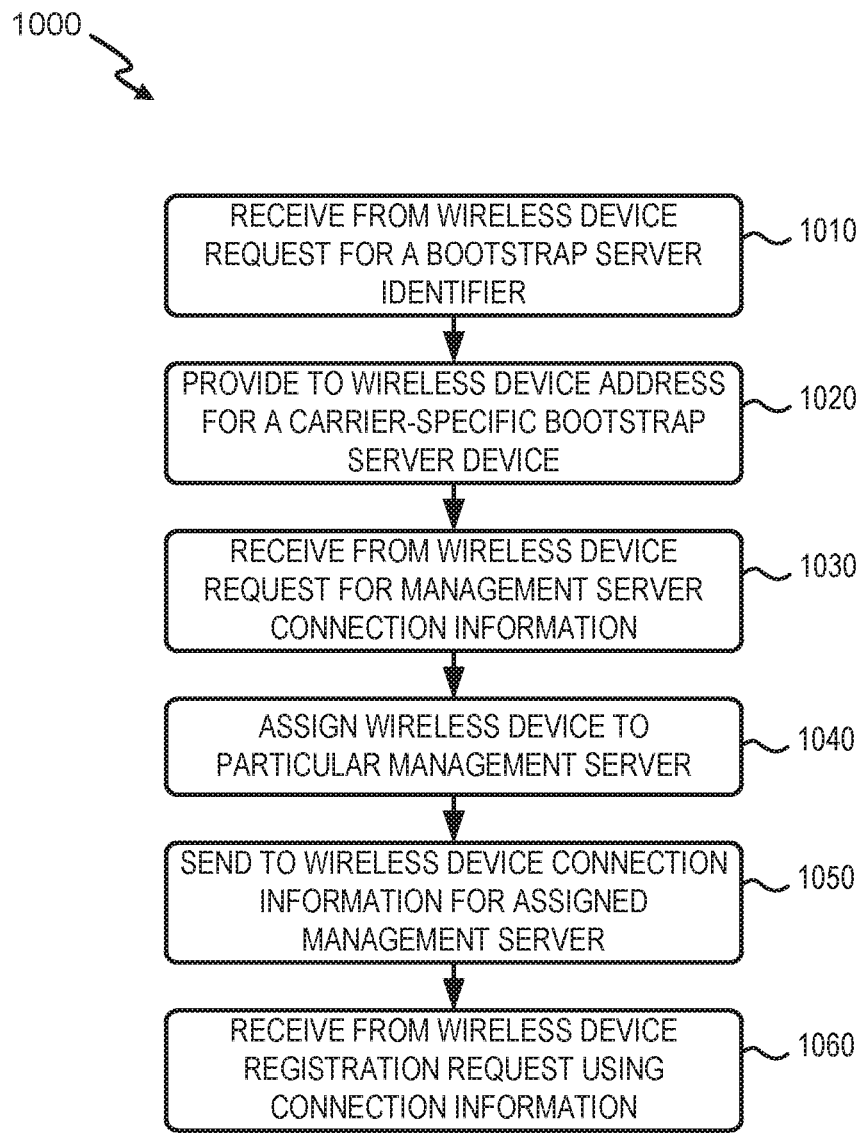
FIG. 10 is a flowchart of a process for discovering and registering with a LW-M2M management server via a bootstrap server according to an implementation described herein.

FIG. 10 is a flow diagram illustrating an exemplary process 1000 for discovering and registering with a LW-M2M management server via a bootstrap server according to an implementation described herein. In one implementation, process 1000 may be performed by PGW device 250 and bootstrap server 160. In another implementation, some or all of process 1000 may be performed by another device or group of devices in network environment 100.

As shown in FIG. 10, process 1000 may include receiving from a wireless device a request for a bootstrap server identifier (block 1010), and providing to the wireless device the address for a carrier-specific bootstrap server device (block 1020). For example, PGW device 250 or another device in access network 130 may receive a request for a bootstrap server identifier (e.g., BSID request 710). In one implementation, BSID request 710 may be included within an attach request for access network 130. In response, PGW device 250 may obtain the address for a carrier-specific bootstrap server device and provide the URL to UE 110 (e.g., as bootstrap server URL 712). In one implementation, bootstrap server URL 712 may be included within a PCO message.

Process 1000 may also include receiving from the wireless device a request for management server connection information (block 1030), assigning the wireless device to a particular management server (block 1040), and sending to the wireless device the connection information for the assigned management server (block 1050). For example, UE 110 may receive bootstrap server URL 712 from PGW device 250 and generate a request for management server connection information 716 using bootstrap server URL 712. Bootstrap server 160 may receive request 716 and, after verifying the request, may assign a management server 150 to UE 110 based on particular load-balancing criteria, and may provide management server connection information 722 to UE 110.

Process 1000 may further include receiving from the wireless device a registration request using the connection information (block 1060). For example, UE device 110 may receive management server connection information 722 and send registration request 724 to management server 150, enabling UE 110 to register with management server 150 and receive instructions, configuration settings, etc.

According to implementations described herein, systems and methods include receiving, by a network device in a wireless access network and from a wireless device, a first request for a bootstrap server identifier. The method also includes providing, to the wireless device, a response including an address for a carrier-specific bootstrap server device. The method also includes receiving, by the carrier-specific bootstrap server device, a request for management server connection information. The request is submitted by the wireless device using the bootstrap server identifier. The method further includes assigning, by the carrier-specific bootstrap server device, the wireless device to a management server of a group of management servers and sending connection information for the management server to the wireless device.

Adoption of the server assignment methods describe herein as an industry standard enables wireless devices, such as M2M devices, to be ported between carriers using OTA techniques and avoid manual reprograming of the ported devices that use LW-M2M.

In the preceding specification, various preferred embodiments have been described with reference to the accompanying drawings. Various modifications and changes may be made thereto, and additional embodiments may be implemented, without departing from the broader scope of the invention as set forth in the claims that follow. The specification and drawings are accordingly to be regarded in an illustrative rather than restrictive sense. For example, while series of blocks have been described with respect to FIG. 10, the order of the blocks may be modified in other implementations. Further, non-dependent blocks may be performed in parallel.

Different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" or "system" that performs one or more functions. These components/systems may include hardware, such as a processor, an ASIC, or a FPGA, or a combination of hardware and software.

No element, act, or instruction used in the present application should be construed as critical or essential to the invention unless explicitly described as such. Also, as used herein, the article "a" and "one of" is intended to include one or more items. Further, the phrase "based on" is intended to mean "based, at least in part, on" unless explicitly stated otherwise.

What is claimed is:

1. A method, comprising:
   receiving, by a network device in a wireless access network and from a wireless device, a first request for a bootstrap server identifier, wherein the first request in included in an attach request for the wireless access network;
   providing, by the network device and to the wireless device, a response to the first request, the response including a network address for a carrier-specific bootstrap server device;
   receiving, by the carrier-specific bootstrap server device, a second request, from the wireless device, for management server connection information, wherein the second request uses the network address for the carrier-specific bootstrap server device;
   assigning, by the carrier-specific bootstrap server device and based on the second request, the wireless device to a management server of a group of management servers; and
   sending, by the carrier-specific bootstrap server device and to the wireless device, connection information for the management server,
   wherein the carrier-specific bootstrap server device is a bootstrap server for a device management system using lightweight machine-to-machine (LW-M2M) protocol.

2. The method of claim 1, further comprising:
   tracking, by the management server, a registration status for the wireless device as assigned to the management server of the group of management servers.

3. The method of claim 1, wherein receiving the first request for the bootstrap server identifier includes:
   receiving in the attach request a Protocol Configuration Option (PCO) attribute value pair (AVP) having a bootstrap server container identifier.

4. The method of claim 1, wherein providing the response to the first request includes:
   providing the response to the first request within a Protocol Configuration Option (PCO) message.

5. The method of claim 4, wherein the PCO message includes a container identifier field for the bootstrap server identifier.

6. The method of claim 1, wherein the network address includes a carrier-specific uniform resource locator (URL) for the carrier-specific bootstrap server device.

7. The method of claim 1, further comprising:
   verifying, after receiving the second request, a user profile for the wireless device.

8. The method of claim 1, wherein sending the connection information for the management server further comprises:
   selecting the management server from a group of available management servers based on a load-balancing criteria.

9. The method of claim 1, wherein the management server includes a bootstrap status flag to indicate when the wireless device has successfully completed a registration with the management server.

10. A system, comprising:
    a network device for a wireless access network, the network device including a first processor configured to:
       receive, from a wireless device, a first request for a bootstrap server identifier, wherein the first request in included in an attach request for the wireless access network, and
       provide, to the wireless device, a response to the first request, the response including a network address for a carrier-specific bootstrap server device; and
    the carrier-specific bootstrap server device including a second processor configured to:
       receive a second request, from the wireless device, for management server connection information, wherein the second request uses the network address for the carrier-specific bootstrap server device;
       assign, based on the second request, the wireless device to a management server of a group of management servers; and
       send to the wireless device, connection information for the assigned management server,
    wherein the carrier-specific bootstrap server device is a bootstrap server for a device management system using lightweight machine-to-machine (LW-M2M) protocol.

11. The system of claim 10, wherein the network address includes a uniform resource locator (URL) for the carrier-specific bootstrap server device.

12. The system of claim 10, wherein the wireless device is configured to use lightweight machine-to-machine communications.

13. The system of claim 10, wherein the first request for the bootstrap server identifier includes a Protocol Configuration Option (PCO) attribute value pair (AVP) having a bootstrap server container identifier.

14. The system of claim 10, wherein the response to the first request in included within a Protocol Configuration Option (PCO) message.

15. The system of claim 10, further comprising:
the management server including a third processor configured to:
track a registration status for the wireless device to indicate when the wireless device has successfully completed a registration with the management server, and
redirect the wireless device to request the bootstrap server identifier from the network device for the wireless access network when the registration status does not indicate that the wireless device has successfully completed a registration with the management server.

16. A non-transitory computer-readable medium storing instructions executable by a computational device to:
receive, from a wireless device, a first request for a bootstrap server identifier, wherein the first request in included in an attach request for the wireless access network;
provide, to the wireless device, a response to the first request, the response including a network address for a carrier-specific bootstrap server device, wherein the carrier-specific bootstrap server device is a bootstrap server for a device management system using lightweight machine-to-machine (LW-M2M) protocol;
receive a second request, from the wireless device, for management server connection information, wherein the second request uses the network address for the carrier-specific bootstrap server device;
assign, based on the second request, the wireless device to a management server of a group of management servers; and
send, to the wireless device, connection information for the management server.

17. The non-transitory computer-readable medium of claim 16, further comprising instructions to:
extract the first request from an attach request for a wireless access network associated with the wireless device.

18. The non-transitory computer-readable medium of claim 16, further comprising instructions to:
assemble a Protocol Configuration Option (PCO) message including the response.

19. The non-transitory computer-readable medium of claim 18, wherein the network address includes a uniform resource locator (URL) for the carrier-specific bootstrap server device.

* * * * *